(12) United States Patent
Park et al.

(10) Patent No.: US 11,515,520 B2
(45) Date of Patent: Nov. 29, 2022

(54) NEGATIVE ELECTRODE ACTIVE MATERIAL FOR LITHIUM SECONDARY BATTERY, PREPARATION METHOD THEREFOR, AND LITHIUM SECONDARY BATTERY COMPRISING SAME

(71) Applicant: SAMSUNG SDI CO., LTD., Yongin-si (KR)

(72) Inventors: Sangeun Park, Yongin-si (KR); Jiyeon Kwak, Yongin-si (KR); Yeongap Kim, Yongin-si (KR); Youngugk Kim, Yongin-si (KR); Uisong Do, Yongin-si (KR); Yuntaek Oh, Yongin-si (KR); Yongchan You, Yongin-si (KR); Changui Jeong, Yongin-si (KR); Inoh Cha, Yongin-si (KR); Hee Seon Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 383 days.

(21) Appl. No.: 16/630,175

(22) PCT Filed: Jul. 10, 2018

(86) PCT No.: PCT/KR2018/007808
§ 371 (c)(1),
(2) Date: Jan. 10, 2020

(87) PCT Pub. No.: WO2019/013525
PCT Pub. Date: Jan. 17, 2019

(65) Prior Publication Data
US 2020/0152970 A1 May 14, 2020

(30) Foreign Application Priority Data
Jul. 12, 2017 (KR) ........................ 10-2017-0088433

(51) Int. Cl.
*H01M 4/36* (2006.01)
*C04B 35/52* (2006.01)
(Continued)

(52) U.S. Cl.
CPC ............. *H01M 4/364* (2013.01); *C04B 35/52* (2013.01); *C04B 35/6265* (2013.01);
(Continued)

(58) Field of Classification Search
CPC ...... H01M 4/133; H01M 4/134; H01M 4/362; H01M 4/364; H01M 4/366; H01M 4/386;
(Continued)

(56) References Cited

U.S. PATENT DOCUMENTS

2007/0190413 A1\* 8/2007 Lee .................... H01M 4/386
429/231.95
2013/0136986 A1 5/2013 Scoyer et al.
(Continued)

FOREIGN PATENT DOCUMENTS

CN 102214821 A 10/2011
CN 106463696 A 2/2017
(Continued)

OTHER PUBLICATIONS

International Search Report dated Feb. 21, 2019 for PCT/KR2018/007808.
Chinese Office Action and Search Report dated Nov. 2, 2021.

*Primary Examiner* — Brittany L Raymond
(74) *Attorney, Agent, or Firm* — Lee IP Law, P.C.

(57) ABSTRACT

The present invention relates to a negative active material for a lithium secondary battery, a preparation method therefor, and a lithium secondary battery including the same. The negative electrode active material is a negative electrode material for a secondary battery, the negative electrode active material comprising a silicon-carbon composite com-
(Continued)

prising: a core comprising crystalline carbon and silicon particles; and an amorphous carbon-containing coating layer disposed on a surface of the core, wherein the negative electrode active material comprises: silicon oxide formed on a surface of the silicon particles; and an oxide of crystalline carbon, formed on a surface of the crystalline carbon, the average particle diameter (D50) of the silicon particles having a nanometer size, the proportion of O relative to Si in the silicon oxide is 30%-50%, and the proportion of O relative to C in the oxide of the crystalline carbon is 4%-10%.

12 Claims, 2 Drawing Sheets

(51) Int. Cl.
| | | |
|---|---|---|
| *C04B 35/626* | (2006.01) | |
| *C04B 35/628* | (2006.01) | |
| *H01M 4/38* | (2006.01) | |
| *H01M 4/587* | (2010.01) | |
| *H01M 4/62* | (2006.01) | |
| *H01M 10/0525* | (2010.01) | |
| *H01M 4/02* | (2006.01) | |

(52) U.S. Cl.
CPC ....... *C04B 35/62839* (2013.01); *H01M 4/366* (2013.01); *H01M 4/386* (2013.01); *H01M 4/587* (2013.01); *H01M 4/628* (2013.01); *H01M 10/0525* (2013.01); *C04B 2235/422* (2013.01); *C04B 2235/428* (2013.01); *H01M 2004/021* (2013.01); *H01M 2004/027* (2013.01)

(58) Field of Classification Search
CPC ....... H01M 4/583; H01M 4/587; C01B 32/15; C01B 33/02
See application file for complete search history.

(56) References Cited

U.S. PATENT DOCUMENTS

| | | |
|---|---|---|
| 2016/0064731 A1 | 3/2016 | Jung et al. |
| 2016/0190552 A1* | 6/2016 | Murata ................ H01M 4/134 |
| | | 429/231.8 |
| 2016/0204420 A1 | 7/2016 | Toulis et al. |
| 2016/0211514 A1 | 7/2016 | Youm |
| 2017/0033357 A1 | 2/2017 | Cho et al. |
| 2017/0200941 A1* | 7/2017 | Yuge .................... H01M 4/366 |
| 2017/0221644 A1 | 8/2017 | Kubota et al. |
| 2017/0222222 A1 | 8/2017 | Lee et al. |

FOREIGN PATENT DOCUMENTS

| | | |
|---|---|---|
| EP | 2838139 A1 | 2/2015 |
| KR | 10-2005-0013841 A | 2/2005 |
| KR | 10-2013-0040198 A | 4/2013 |
| KR | 10-2013-0049018 A | 5/2013 |
| KR | 10-2014-0134433 A | 11/2014 |
| KR | 10-2015-0117316 A | 10/2015 |
| KR | 10-2016-0028534 A | 3/2016 |
| KR | 10-2016-0030276 A | 3/2016 |
| KR | 10-2016-0040104 A | 4/2016 |
| KR | 10-2016-0088181 A | 7/2016 |
| WO | WO 2015/186742 A1 | 12/2015 |

* cited by examiner

NEGATIVE ELECTRODE ACTIVE MATERIAL FOR LITHIUM SECONDARY BATTERY, PREPARATION METHOD THEREFOR, AND LITHIUM SECONDARY BATTERY COMPRISING SAME

CROSS REFERENCE TO RELATED APPLICATIONS

This is the U.S. national phase application based on PCT Application No. PCT/KR2018/007808, filed Jul. 10, 2018, which is based on Korean Patent Application No. 10-2017-0088433 filed on Jul. 12, 2017, the entire contents of all of which are hereby incorporated by reference.

TECHNICAL FIELD

A negative active material for a lithium secondary battery, preparation method therefor, and a lithium secondary battery including the same are disclosed.

BACKGROUND ART

A lithium secondary battery is operated for a long term as well as has a high driving voltage and high energy density and thus may satisfy complicated requirements according to diversification and combination of devices. Recently, an effort to much develop a conventional lithium secondary battery technology and thus expand its application to a power storage and the like as well as an electrical vehicle has been actively made.

In addition, the demand for high-capacity lithium secondary battery is high, and research on this is being actively conducted. However, there is a limit to increasing a capacity of the lithium secondary battery. Recently, various studies have been conducted to overcome the limitation of capacity increase by reducing a charge time through rapid charge.

DISCLOSURE

Technical Problem

An embodiment provides a negative active material for a lithium secondary battery that exhibits improved cycle-life characteristics and improved swelling characteristics.

Another embodiment provides a method of preparing the negative active material.

Another embodiment provides a lithium secondary battery including the negative active material.

Technical Solution

An embodiment of the present invention provides a negative active material for a lithium secondary battery including a silicon-carbon composite including a core including crystalline carbon and silicon particles and an amorphous carbon-containing coating layer disposed on a surface of the core, wherein the negative active material includes a silicon oxide formed on a surface of the silicon particles and an oxide of crystalline carbon formed on a surface of the crystalline carbon, an average particle diameter (D50) of the silicon particles has a nanometer size, a ratio of O relative to Si in the silicon oxide is 30 wt % to 50 wt %, and a ratio of O relative to C in the oxide of the crystalline carbon is 4 wt % to 10 wt %.

The average diameter (D50) of the silicon particles may be 5 nm to 500 nm.

A content of the silicon oxide may be 1 wt % to 20 wt % based on a total weight, 100 wt % of the silicon-carbon composite.

A content of the oxide of crystalline carbon may be 2 wt % to 10 wt % based on a total weight, 100 wt % of the silicon-carbon composite.

The crystalline carbon may be artificial graphite, natural graphite, or a combination thereof.

Another embodiment provides a method of preparing a negative active material for a lithium secondary battery including mixing crystalline carbon particles having an oxide of crystalline carbon on the surface and silicon particles having an oxide of silicon particles on the surface to prepare a first mixture; adding an amorphous carbon precursor to the first mixture to prepare a second mixture; and heat-treating the second mixture.

The crystalline carbon particles having the oxide of crystalline carbon on the surface may be prepared by heat-treating crystalline carbon particles under a nitrogen atmosphere, an oxygen atmosphere, an air atmosphere, or a combination atmosphere.

The silicon particles having the oxide of silicon particles on the surface may be prepared by heat-treating silicon particles under a nitrogen atmosphere, an oxygen atmosphere, an air atmosphere, or a combination atmosphere.

The mixing may be performed at 70° C. to 90° C.

A mixing ratio of the crystalline carbon particles having the oxide of crystalline carbon on the surface and the silicon particles having the oxide of silicon particles on the surface may be 10:90 wt % to 90:10 wt %.

A mixing ratio of the first mixture and the amorphous carbon precursor may be 5:95 wt % to 30:70 wt %.

Another embodiment provides a lithium secondary battery including a negative electrode including the negative active material, a positive electrode including a positive active material, and an electrolyte.

Other embodiments of the present invention are included in the following detailed description.

Advantageous Effects

The negative active material for a lithium secondary battery according to an embodiment may exhibit improved cycle-life characteristics and improved swelling characteristics.

MODE FOR INVENTION

Figure 1:
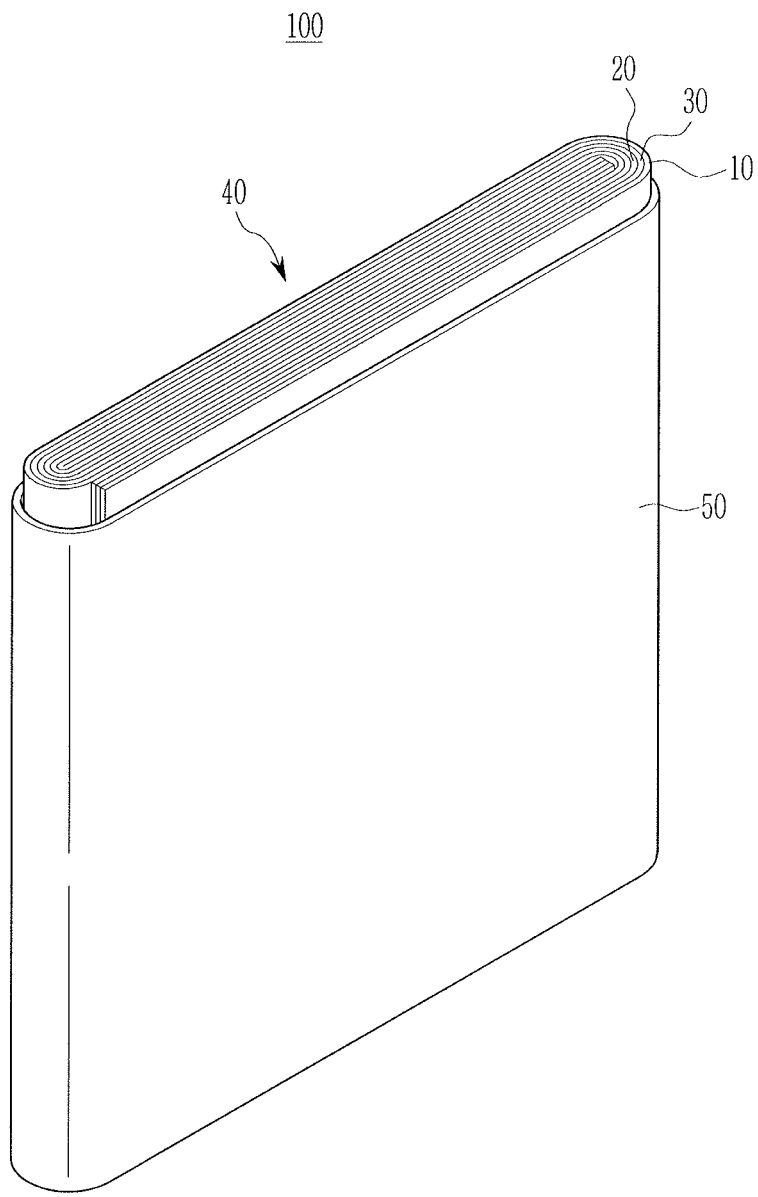
FIG. 1 is a schematic view showing a structure of a positive active material according to an embodiment.

Hereinafter, embodiments of the present invention are described in detail. However, these embodiments are exemplary, the present invention is not limited thereto and the present invention is defined by the scope of claims.

A negative active material for a lithium secondary battery according to an embodiment of the present invention includes a silicon-carbon composite including a core including crystalline carbon and silicon particles and an amorphous carbon-containing coating layer disposed on the surface of the core.

Herein, the silicon oxide formed on the surface of the silicon particles and an oxide of crystalline carbon formed on a surface of the crystalline carbon are included.

The average diameter (D50) of the silicon particles may be a nanometer size and the average diameter (D50) of the silicon particles may be 5 nm to 500 nm. When the average diameter (D50) of the silicon particles is larger than the nanometer size, for example, in a micrometer level, a defect of expansion may be increased. Particularly, when the average diameter (D50) of the silicon particles is in a range of 50 nm to 150 nm, improved cycle-life characteristics and improved effects of suppressing the expansion may be obtained. Unless otherwise defined herein, the average particle diameter (D50) refers to a diameter of the particles having a cumulative volume of 50 volume % in a particle size distribution.

In this way, when the negative active material according to an embodiment includes a silicon oxide formed by oxidation of the surface of the silicon particles and thus present on the surface of the silicon particles, surface stability may be increased, and the cycle-life characteristics may be improved. In addition, when the negative active material according to an embodiment includes an oxide of the crystalline carbon formed by oxidation of the surface of the crystalline carbon and thus present on the surface of the crystalline carbon, impurities on the surface of the crystalline carbon may be removed, cycle-life characteristics of the silicon-carbon composite may be improved, and binding characteristics of a binder may be enhanced, and accordingly, excellent binding strength of the active material itself and the active material to a current collector is obtained, and swelling characteristics may be improved.

In general, a silicon-carbon composite exhibits high capacity, a high expansion ratio, and low cycle-life characteristics due to a high expansion ratio and low cycle-life characteristics of silicon itself, but as described above, the negative active material according to an embodiment has the silicon oxide present on the surface of the silicon particles and the oxide of the crystalline carbon present on the surface of the crystalline carbon and thus may maintain excellent capacity and exhibit an improved expansion ratio, that is, improved swelling characteristics and also, improved cycle-life characteristics. In addition, this effect is obtained when an oxide is formed on both of the surfaces of the silicon particles and the crystalline carbon, but when the oxide is formed either one surface of the silicon particles and the crystalline carbon, for example, when the oxide is formed on the surface of the silicon particles alone, the expansion improvement effect may be insignificant, and when the oxide is formed on the surface of the crystalline carbon alone, the cycle-life improvement effect may be insignificant.

In the silicon oxide, a ratio of O relative to Si may be in a range of 30 wt % to 50 wt % or 35 wt % to 45 wt %. In addition, a ratio of O relative to C in the oxide of the crystalline carbon may be in a range of 4 wt % to 10 wt % or 5 wt % to 7 wt %.

When the ratio of O relative to Si in the silicon oxide is less than 30 wt % or greater than 50 wt %, the cycle-life improvement effect may be almost not obtained, or the cycle-life characteristics may be rather deteriorated due to excessive oxidation. and when the ratio of O relative to C in the oxide of the crystalline carbon is less than 4 wt %, affinity with the binder is deteriorated, and resultantly, adherence to a current collector is deteriorated, and when the ratio of O relative to C in the oxide of the crystalline carbon is greater than 10 wt %, capacity may be deteriorated.

A content of the silicon oxide may be 1 wt % to 10 wt % or 2 wt % to 5 wt % based on 100 wt % of a total weight of the silicon-carbon composite. When the content of the silicon oxide is included within the range, initial efficiency may be minimized, and the cycle-life characteristics may be improved.

The content of the oxide of the crystalline carbon may be in a range of 1 wt % to 10 wt % based on 100 wt % of a total weight of the silicon-carbon composite. When the oxide of the crystalline carbon is within the range, the capacity deterioration may be minimized, and the expansion may be improved.

The crystalline carbon may be artificial graphite, natural graphite or a combination thereof.

The negative active material may be prepared in the following process.

The silicon particles and the crystalline carbon are respectively oxidized. When this oxidation process is performed by mixing the silicon particles and the crystalline carbon, the silicon particles and the crystalline carbon are oxidized at different temperatures, the silicon particles may not be oxidized at an oxidation temperature of the crystalline carbon, while the crystalline carbon may be burn away ($C+O_2 \Rightarrow CO_2$) to remove at an oxidation temperature of the silicon particles.

The oxidation treatment may be performed through a heat treatment of the silicon particles under a nitrogen atmosphere, an oxygen atmosphere, an air atmosphere, or under a combination atmosphere thereof. The heat treatment may be performed at 700° C. to 1000° C. for 0.5 hours to 10 hours. When the oxidation is performed, the surface of the silicon particles is oxidized, and a silicon oxide may be formed on the surface. When the heat treatment is performed under the atmosphere, temperature, and time conditions, the silicon oxide may have a ratio of O relative to Si in a range of 30% to 50%. When the heat treatment is not performed under the above conditions, an oxidation reaction on the surface of the silicon particles may not occur or excessively occur.

The silicon particles may have an average particle diameter (D50) of a nanometer size in a range of 50 nm to 150 nm.

In addition, the oxidation of the crystalline carbon may be performed through a heat treatment of the crystalline carbon under a nitrogen atmosphere, an oxygen atmosphere, an air atmosphere, or a combination atmosphere thereof. The heat treatment process may be performed at 500° C. to 700° C. for 1 hour to 10 hours. When the oxidation treatment is performed, the surface of the crystalline carbon is oxidized, and an oxide of the crystalline carbon may be formed on the surface. When the heat treatment process is performed under the atmosphere, temperature, and time conditions, the oxide of the crystalline carbon may have a ratio of O relative to C in a range of 30% to 50%. When the heat treatment process is not performed under the conditions, the surface oxidation reaction of the crystalline carbon may not occur or may excessively occur.

In this way, the crystalline carbon particle having the oxide of the crystalline carbon formed on the surface through the oxidation process and the silicon particles having the oxide of the silicon particles on the surface are mixed to prepare a first mixture. Herein, the crystalline carbon particle and the silicon particles are mixed in a ratio of 40:60 wt % to 60:40 wt %. When the crystalline carbon particle and the silicon particles are mixed within the range, more excellent capacity and cycle-life characteristics may be obtained.

The mixing process may be performed, while heated at 70° C. to 90° C. When the mixing process is performed while heated, a dried powder mixture may be obtained.

In addition, the mixing process may be performed in a solvent, and the solvent may be alcohol such as ethanol, methanol, or isopropylalcohol or a combination thereof. When the mixing process is performed by using this solvent, the solvent may be easily removed.

Before performing the mixing process, a milling process of the silicon particles having an oxide of the silicon particles on the surface may be further performed. This milling process may be performed with a ball mill or a beads mill, wherein the ball or beads may be formed of zirconia, alumina, and the like.

In addition, as this milling process is performed, the silicon particles may effectively maintain an average particle diameter (D50) of a nanometer size, and when the silicon particles have a larger average particle diameter (D50) than the nanometer, the milling process may be performed to have the nanometer size.

The first mixture may be sieved to appropriately adjust a diameter. The diameter, that is, the average diameter may be in an appropriate range of 10 μm to 20 μm, and when the diameter is included within the range, excellent cycle-life characteristics and improved expansion characteristics may be obtained. When the first mixture has a diameter of greater than 20 μm, the particles may become coarse and thus excessively increase the expansion, but when the diameter is less than 10 μm, fine particles are increased, a surface area thereof is excessively increased, and accordingly, long cycle-life characteristics may be deteriorated.

Subsequently, an amorphous carbon precursor is added to the first mixture to prepare a second mixture. The amorphous carbon precursor may include coal pitch, mesophase pitch, petroleum pitch, coal-based oil, petroleum-based heavy oil, or a polymer resin such as a phenol resin, a furan resin, a polyimide resin, and the like.

The first mixture and the amorphous carbon precursor are mixed in a ratio of 95:5 wt % to 80:20 wt %. When the mixing ratio of the first mixture and the amorphous carbon precursor are within the range, there may be merits. Particularly, since the silicon-carbon composite including the silicon particles including the silicon oxide on the surface and the crystalline carbon including the oxide of the crystalline carbon on the surface is used, a content of the amorphous carbon precursor may be reduced from a conventional amount of 15 wt % to 30 wt % into 5 wt % to 20 wt %, and accordingly, there may reduce problems of deteriorating efficiency and capacity and increasing DC-IR (direct current internal resistance) during stored at a high temperature, which may occur when the amorphous carbon precursor is excessively used.

The obtained second mixture may be heat-treated to prepare the negative active material for a lithium secondary battery. The heat treatment process may be performed at 500° C. to 1000° C. for 1 hour to 10 hours. The heat treatment process may be performed under a nitrogen atmosphere, an oxygen atmosphere, or a combination thereof.

In the heat treatment process, the amorphous carbon precursor is converted into amorphous carbon and thus formed into an amorphous carbon-containing coating layer on the surface of the core including the crystalline carbon and the silicon particle.

As for the negative active material prepared by using the oxidized silicon particles and crystalline carbon according to an embodiment of the present invention, an oxide is present on each surface of the crystalline carbon and the silicon particles included in the core, but when the core is formed by mixing the crystalline carbon and the silicon particle, the amorphous carbon-containing coating layer is formed on the core, and then, an oxidation treatment is performed, an oxide of the amorphous carbon is formed on the surface of the coating layer alone but not on both surfaces of the crystalline carbon and the silicon particle. When the oxide is formed on the surface of the coating layer alone, the expansion problem may be improved, but the cycle-life characteristics may not be improved.

Another embodiment of the present invention provides a lithium secondary battery including a positive electrode including a positive active material, a negative electrode including the negative active material, and an electrolyte.

In a positive active material layer, the positive active material may be a compound (lithiated intercalation compound) being capable of intercalating and deintercallating lithium, and specifically one or more composite oxides of a metal selected from cobalt, manganese, nickel, and a combination thereof, and lithium. More specifically, the compounds represented by one of the following chemical formulae may be used. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0 \le b \le 0.5$, $0 \le c \le 0.05$); $Li_aE_{2-b}X_bO_{4-c}D_c$ ($0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 \le \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 \le \alpha \le 2$); $Li_aNi_{1-b-c}Mn_bX_cD_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 \le \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_b Co_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$) $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $Li_aFePO_4$ ($0.90 \le a \le 1.8$)

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known in the related field.

In the positive electrode, the content of the positive active material may be 90 wt % to 98 wt % based on the total weight of the positive active material layer.

In an embodiment of the present invention, the positive active material layer may further include a binder and a conductive material. Herein, the binder and the conductive material may be included in an amount of 1 wt % to 5 wt %, respectively based on a total amount of the positive active material layer.

The binder improves binding properties of positive active material particles with one another and with a current collector, and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity and any electrically conductive material may be used as a conductive material unless it causes a chemical change, and examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The negative electrode includes a current collector and a negative active material layer disposed on the current collector and including a negative active material.

In the negative active material layer, the negative active material may be included in an amount of 95 wt % to 99 wt % based on the total weight of the negative active material layer.

In an embodiment of the present invention, the negative active material layer includes a binder, and optionally a conductive material. In the negative active material layer, a content of the binder may be 1 wt % to 5 wt % based on a total weight of the negative active material layer. When the negative active material layer includes a conductive material, the negative active material layer includes 90 wt % to 98 wt % of the negative active material, 1 wt % to 5 wt % of the binder, and 1 wt % to 5 wt % of the conductive material.

The binder improves binding properties of negative active material particles with one another and with a current collector. The binder may use a non-aqueous binder, an aqueous binder, or a combination thereof.

The non-aqueous binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may be a styrene-butadiene rubber, an acrylated styrene-butadiene rubber (SBR), an acrylonitrile-butadiene rubber, an acrylic rubber, a butyl rubber, a fluorine rubber, an ethylene propylene copolymer, polyepichlorohydrine, polyphosphazene, polyacrylonitrile, polystyrene, an ethylene propylenediene copolymer, polyvinylpyridine, chlorosulfonated polyethylene, latex, a polyester resin, an acrylic resin, a phenolic resin, an epoxy resin, polyvinyl alcohol, polyacrylic acid, or a combination thereof.

When the aqueous binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. The thickener may be included in an amount of 0.1 parts by weight to 3 parts by weight based on 100 parts by weight of the negative active material.

The conductive material is included to provide electrode conductivity and any electrically conductive material may be used as a conductive material unless it causes a chemical change, and examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be selected from a copper foil, a nickel foil, a stainless steel foil, a titanium foil, a nickel foam, a copper foam, a polymer substrate coated with a conductive metal, and a combination thereof.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. The ketone-based solvent may include cyclohexanone, and the like. In addition, the alcohol-based solvent may include ethanol, isopropyl alcohol, and the like and the aprotic solvent may include nitriles such as R—CN (wherein R is a hydrocarbon group having a C2 to C20 linear, branched, or cyclic structure and may include a double bond, an aromatic ring, or an ether bond), and the like, amides such as dimethyl formamide, and the like, dioxolanes such as 1,3-dioxolane, and the like, sulfolanes, and the like.

The organic solvent may be used alone or in a mixture, and when the organic solvent is used in a mixture, the mixture ratio may be controlled in accordance with a desirable battery performance.

The carbonate-based solvent may include a mixture with a cyclic carbonate and a linear (chain) carbonate. The cyclic carbonate and linear carbonate are mixed together in a volume ratio of 1:1 to 1:9, which may provide enhanced performance of an electrolyte.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

[Chemical Formula 1]

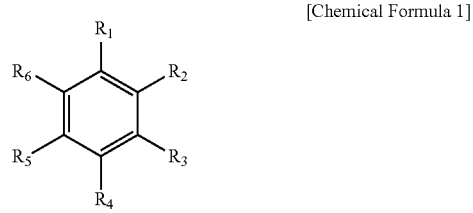

In Chemical Formula 1, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 2 in order to improve a battery cycle-life.

[Chemical Formula 2]

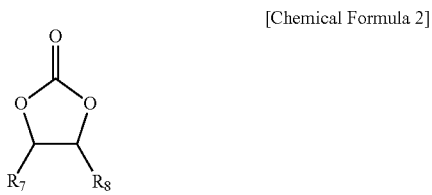

In Chemical Formula 2, $R_7$ and $R_8$ are the same or different, and selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When such an additive for improving cycle-life is further used, the amount may be controlled within an appropriate range.

The lithium salt dissolved in an organic solvent supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2+1}SO_2)$ (where x and y are natural numbers, for example an integer of 1 to 20), LiCl, LiI, and $LiB(C_2O_4)_2$ (lithium bis(oxalato) borate; LiBOB). A concentration of the lithium salt may range from 0.1 M to 2.0 M. When the lithium salt is included at the above concentration range, an electrolyte may have excellent performance and lithium ion mobility due to optimal electrolyte conductivity and viscosity.

In addition, a separator may be disposed between the positive electrode and the negative electrode depending on a type of the lithium secondary battery. Such a separator may include polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

FIG. 1 is an exploded perspective view of a lithium secondary battery according to an embodiment. The lithium secondary battery according to an embodiment is illustrated as a prismatic battery but is not limited thereto and may include variously-shaped batteries such as a cylindrical battery, a pouch-type battery, and the like.

Referring to FIG. 1, a lithium secondary battery 100 according to an embodiment includes a wound electrode assembly 40 including a positive electrode 10, a negative electrode 20 and a separator 30 disposed therebetween, and a case 50 housing the electrode assembly 40. The positive electrode 10, the negative electrode 20, and the separator 30 may be impregnated in an electrolyte solution (not shown).

EXAMPLES

Hereinafter, examples of the present invention and comparative examples are described. However, the present invention is not limited to the following examples.

Comparative Example 1

Natural graphite powder was treated through an oxidation process of performing a heat treatment at 500° C. under an air atmosphere for 2 hours to obtain oxidized graphite powder having an oxide on the surface.

In a beaker containing ethanol, the oxidized graphite powder obtained in the above process was mixed with silicon having an average particle diameter (D50) of 150 nm in a ratio of 50:50 wt %, and the mixture was heated and stirred at 90° C. for 5 hours to obtain dried mixed powder.

Since the solvent of the ethanol was evaporated during the stirring process, powder remaining after the evaporation of alcohol was sieved with a 325 mesh to obtain powder. 90 wt % of the obtained powder was mixed with 10 wt % of coal pitch, amorphous carbon.

The obtained mixture was fired at 600° C. under an $N_2$ atmosphere for 2 hours, and the fire powder was sieved again with the 325 mesh to prepare manufacture a negative active material of a silicon-carbon composite including a core having graphite having an oxide of the graphite on the surface and silicon particles and a coal pitch coating layer on the surface of the core. Herein, a content of the oxide of the graphite was 5 wt % based on 100 wt % of a total weight of the silicon-carbon composite.

Comparative Example 2

Si particles were milled to have an average particle diameter (D50) of 150 nm and then, fired for an oxidation treatment at 600° C. for 2 hours under an air atmosphere to obtain oxidized silicon having a silicon oxide on the surface.

In a beaker containing ethanol, the oxidation-treated silicon and natural graphite powder were mixed in a ratio of 50:50 wt % and then, stirred while heated at 90° C. for 5 hours.

Since the ethanol was evaporated during the stirring process, powder remaining after the evaporation of alcohol was sieved with a 325 mesh to obtain powder.

10 wt % of coal pitch, amorphous carbon, was added to 90 wt % of the obtained powder and then, mixed therewith.

The obtained mixture was fired at 600° C. for 2 hours under an $N_2$ atmosphere, and the fired powder was sieved again with a 325 mesh to prepare a negative active material of a silicon-carbon composite including a core including graphite and silicon particles having a silicon oxide on the surface and a coal pitch coating layer on the surface of the core. Herein, a content of the silicon oxide was 10 wt % based on 100 wt % of a total weight of the silicon-carbon composite.

Example 1

Natural graphite powder was heat-treated for an oxidation at 500° C. under an air atmosphere for 2 hours to obtain oxidized graphite powder having an oxide on the surface.

Si particles were milled to have an average particle diameter (D50) of 150 nm and then, fired for an oxidation at 600° C. under an air atmosphere for 2 hours to obtain oxidized silicon having a silicon oxide on the surface.

In a beaker containing ethanol, the oxidized silicon and graphite powder were mixed in a ratio of 50:50 wt % and then, stirred while heated at 90° C. for 5 hour.

Since the solvent of the ethanol was evaporated during the stirring process, and powder remaining after the evaporation of alcohol was sieved with a 325 mesh to obtain powder having an average particle diameter of 10 μm to 20 μm.

10 wt % of coal pitch, amorphous carbon, was added to 90 wt % of the obtained powder and then, mixed therewith.

The obtained mixture was fired at 600° C. for 2 hours under an $N_2$ atmosphere, and the fired powder was sieved again with a 325 mesh to prepare a negative active material of a silicon-carbon composite including a core including graphite having an oxide formed on the surface and silicon particles having a silicon oxide formed on the surface and a coal pitch coating layer on the surface of the core. Herein, a content of the silicon oxide was 5 wt % based on 100 wt % of a total weight of the silicon-carbon composite, and a content of the oxide of the graphite was 10 wt % based on 100 wt % of a total weight of the silicon-carbon composite.

Comparative Example 3

Si particles were milled to have an average particle diameter (D50) of 150 nm and then, mixed with natural graphite in a ratio of 50:50 wt % in a beaker containing ethanol and then, stirred while heated at 90° C. for 5 hours.

Since the solvent of the ethanol was evaporated during the stirring process, powder remaining after the evaporation of alcohol was sieved with a 325 mesh, and 10 wt % of coal pitch, amorphous carbon, was added to 90 wt % of the obtained powder and mixed therewith.

The obtained mixture was sieved with a 325 mesh to prepare a negative active material of a silicon-carbon composite including a core including silicon and graphite and a coal pitch coating layer on the surface of the core.

Comparative Example 4

Si particles were milled to have an average particle diameter (D50) of 150 nm and then, mixed with artificial graphite in a ratio of 50:50 wt % in a beaker containing ethanol and then, stirred, while heated at 90° C. for 5 hours.

Since the solvent of the ethanol was evaporated during the stirring process, powder remaining after the evaporation of alcohol was sieved with a 325 mesh, and 10 wt % of coal pitch, amorphous carbon, was added to 90 wt % of the obtained powder and then, mixed therewith.

The obtained mixture was fired at 600° C. for 2 hours under an $N_2$ atmosphere, and the fired powder was sieved with a 325 mesh to prepare a negative active material of a silicon-carbon composite including a core including silicon and graphite and a coal pitch coating layer on the surface of the core. The silicon-carbon composite negative active material particles were oxidation-treated at 500° C. for 2 hours under an air atmosphere to obtain an oxidized silicon-carbon composite negative active material having a silicon oxide formed on the surface.

Comparative Example 5

Si particles were milled to have an average particle diameter (D50) of 150 nm and then, mixed with artificial graphite in a ratio of 50:50 wt % in a beaker containing ethanol and stirred, while heated at 90° C. for 5 hours.

Since the solvent of the ethanol was evaporated during the stirring process, powder remaining after the evaporation of alcohol was sieved with a 325 mesh, and 10 wt % of coal pitch, amorphous carbon, was added to 90 wt % of the obtained powder and then, mixed therewith.

The obtained mixture was fired for primary oxidation at 600° C. for 2 hours under an $N_2$ atmosphere, and the fired powder was sieved with a 325 mesh to prepare a negative active material of a silicon-carbon composite including a core including silicon and graphite and a coal pitch coating layer on the surface of the core.

The silicon-carbon composite negative active material particles were fired for secondary oxidation at 600° C. for 2 hours under an air atmosphere to obtain an oxidized silicon-carbon composite negative active material having a silicon oxide formed on the surface.

In the negative active materials according to Example 1 and Comparative Examples 1 to 5, a content of O relative to that of Si in the silicon oxide and a content of O relative to that of C in the graphite oxide were measured, and the results are shown in Table 1.

In addition, in negative electrodes manufactured by respectively using the negative active materials according to Example 1 and Comparative Examples 1 to 5, adherence between a current collector and a negative active material layer was measured by using a tensile strength tester, and the results are shown in Table 1.

The negative electrodes were respectively manufactured by using 80 wt % of a negative active material, 10 wt % of polyacrylic acid (PAA), and 10 wt % of a ketjen black conductive material in distilled water to prepare negative active material slurry and coating the negative active material slurry on a Cu foil and then, compressing and drying it.

TABLE 1

|  | Content of O relative to Si in silicon oxide (wt %) | Content of O relative to C in graphite oxide (wt %) | Adhesion strength (gf/mm) |
|---|---|---|---|
| Comparative Example 1 | 21 | 4.5 | 1.8 |
| Comparative Example 2 | 35 | 1.1 | 1.1 |
| Example 1 | 36 | 4.8 | 2.1 |
| Comparative Example 3 | 20 | 1 | 0.8 |
| Comparative Example 4 | 33 | 2.4 | 1.4 |
| Comparative Example 5 | 32 | 3.2 | 1.3 |

As shown in Table 2, Example 1 using a negative active material including a silicon and graphite-containing core having a silicon oxide and a graphite oxide formed on the surface exhibited the most excellent adherence. Regarding this, Comparative Examples 1 and 2 oxidizing graphite alone or oxidizing silicon alone exhibited a little deteriorated adherence, and Comparative Example 3 using a mixture of silicon and graphite without oxidization, Comparative Example 4 twice performing the oxidization, and Comparative Example 5 once performing the oxidization exhibited deteriorated adherence. The reason that Comparative Examples 4 and 5 exhibited low adherence is that the amorphous carbon was oxidized and lost.

*Cycle-Life Characteristics Evaluation 80 wt % of each negative active material Example 1 and Comparative Examples 1 to 5, 10 wt % of polyacrylic acid (PAA), and 10 wt % of a ketjen black conductive material were mixed in distilled water to prepare negative active material slurry.

The negative active material slurry was coated on a Cu foil and then, dried and compressed to manufacture each negative electrode.

Each negative electrode, a lithium metal counter electrode, and an electrolyte were used to manufacture a half-cell. The electrolyte was prepared by dissolving 1.0 M $LiPF_6$ in a mixed solvent of ethylene carbonate and dimethyl carbonate (a volume ratio of 50:50).

Figure 2:
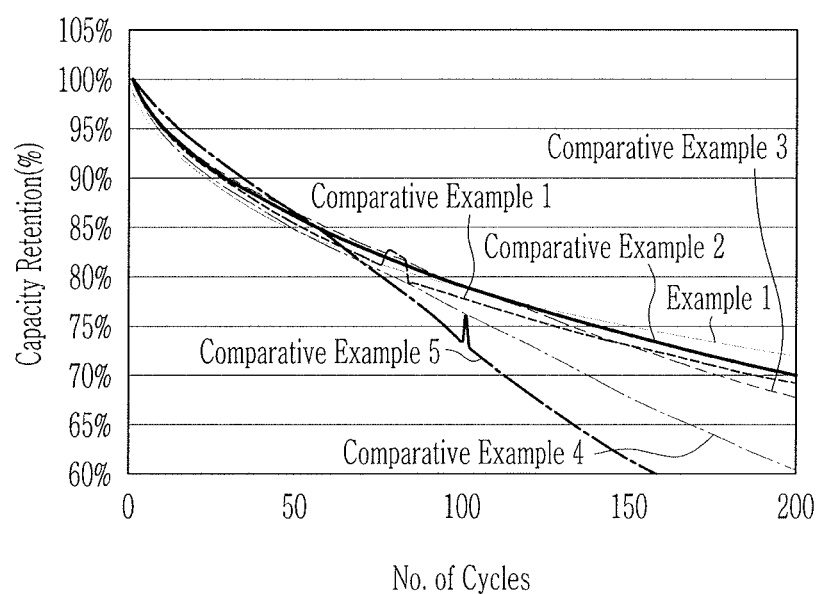
FIG. 2 is a graph showing capacity retention of the half-cells using the negative active materials of Example 1 and Comparative Examples 1 to 5.

The manufactured half-cells were 50 times charged and discharged at 0.5 C, and then, a ratio of discharge capacity at each cycle relative to discharge capacity at the first cycle was calculated, and the results are shown in FIG. 2.

As shown in FIG. 2, the half-cell using the negative active material of Example 1 including silicon and natural graphite having each oxide on the surfaces by respectively oxidizing the silicon and the natural graphite as a core exhibited the most excellent cycle-life characteristics. On the contrary, the half-cells respectively using the negative active materials of Comparative Examples 1 to 5 exhibited deteriorated cycle-life characteristics, and particularly, the half-cells respectively using the negative active materials of Comparative Examples 4 and 5 exhibited greatly deteriorated cycle-life characteristics. The reason that the half-cells respectively using the negative active materials of Comparative Examples 4 and 5 exhibited greatly deteriorated cycle-life characteristics is that the amorphous carbon was considerably lost during the oxidization process.

While this invention has been described in connection with what is presently considered to be practical example embodiments, it is to be understood that the invention is not limited to the disclosed embodiments, and on the contrary, it is intended to cover various modifications and equivalent arrangements included within the spirit and scope of the appended claims.

The invention claimed is:

1. A negative active material for a lithium secondary battery comprising a silicon-carbon composite including a core including crystalline carbon and silicon particles and an amorphous carbon-containing coating layer disposed on a surface of the core,
wherein:
the negative active material comprises:
a silicon oxide formed on a surface-of the silicon particles, and
an oxide of crystalline carbon formed on a surface of the crystalline carbon,
an average particle diameter (D50) of the silicon particles has a nanometer size,
a ratio of O relative to Si in the silicon oxide is 30 wt % to 50 wt %, and
a ratio of O relative to C in the oxide of the crystalline carbon is 4 wt % to 10 wt %.

2. The negative active material of claim 1, wherein the average diameter (D50) of the silicon particles is 5 nm to 500 nm.

3. The negative active material of claim 1, wherein a content of the silicon oxide is 1 wt % to 20 wt % based on a total weight of the silicon-carbon composite.

4. The negative active material of claim 1, wherein a content of the crystalline carbon is 2 wt % to 10 wt % based on a total weight of the silicon-carbon composite.

5. The negative active material of claim 1, wherein the crystalline carbon is artificial graphite, natural graphite, or a combination thereof.

6. A method of preparing a negative active material for a lithium secondary battery comprising
mixing crystalline carbon particles having an oxide of crystalline carbon on the surface and silicon particles having an oxide of silicon particles on the surface to prepare a first mixture;
adding an amorphous carbon precursor to the first mixture to prepare a second mixture; and
heat-treating the second mixture.

7. The method of claim 6, wherein the crystalline carbon particles having the oxide of crystalline carbon on the surface are prepared by heat-treating crystalline carbon particles under a nitrogen atmosphere, an oxygen atmosphere, an air atmosphere, or a combination atmosphere.

8. The method of claim 6, wherein the silicon particles having the oxide of silicon particles on the surface are prepared by heat-treating silicon particles under a nitrogen atmosphere, an oxygen atmosphere, an air atmosphere, or a combination atmosphere.

9. The method of claim 6, wherein the mixing is performed at 70° C. to 90° C.

10. The method of claim 6, wherein a mixing ratio of the crystalline carbon particles having the oxide of crystalline carbon on the surface and the silicon particles having the oxide of silicon particles on the surface is 10: 90 wt % to 90: 10 wt %.

11. The method of claim 6, wherein a mixing ratio of the first mixture and the amorphous carbon precursor is 5:95 wt % to 30:70 wt %.

12. A lithium secondary battery, comprising
a negative electrode comprising the negative active material of claim 1;
a positive electrode including a positive active material; and
an electrolyte.

* * * * *